(12) United States Patent
Shaefer

(10) Patent No.: US 7,874,717 B1
(45) Date of Patent: *Jan. 25, 2011

(54) NIGHT LIGHT

(76) Inventor: Louisa Shaefer, 406 Shadowbluff Dr., San Antonio, TX (US) 78216

( * ) Notice: Subject to any disclaimer, the term of this patent is extended or adjusted under 35 U.S.C. 154(b) by 0 days.

This patent is subject to a terminal disclaimer.

(21) Appl. No.: 10/047,660

(22) Filed: Jan. 15, 2002

Related U.S. Application Data

(63) Continuation of application No. 09/222,901, filed on Dec. 30, 1998, now Pat. No. 6,390,647.

(60) Provisional application No. 60/070,248, filed on Dec. 31, 1997.

(51) Int. Cl.
*F21V 33/00* (2006.01)

(52) U.S. Cl. .................... 362/641; 362/642

(58) Field of Classification Search .......... 362/276, 362/295, 802, 226, 267, 311, 374, 375, 95, 362/641, 642, 643, 644
See application file for complete search history.

(56) References Cited

U.S. PATENT DOCUMENTS

| | | | | |
|---|---|---|---|---|
| 4,343,032 A | * | 8/1982 | Schwartz | 362/276 |
| 5,465,198 A | * | 11/1995 | Kellogg | 362/276 |
| 5,495,402 A | * | 2/1996 | Houssian | 362/226 |
| 5,544,025 A | * | 8/1996 | Bohlool et al. | 362/95 |
| 5,964,516 A | * | 10/1999 | Lai | 362/95 |
| 6,114,813 A | * | 9/2000 | Lo et al. | 315/159 |
| 6,390,647 B1 | * | 5/2002 | Shaefer | 362/276 |

* cited by examiner

*Primary Examiner*—Bao Q Truong

(57) ABSTRACT

A night light design which allows for improved functionality over those heretofore available. The basic design is flexible enough to be adapted for either indoor or outdoor use, and for various brightness levels. Particularly for outdoor use, bulbs of up to 15 watts can be used, providing an increased illumination level. All designs preferably include a light sensing element and a control circuit, wherein the light turns itself on when the ambient lighting levels fall low enough. Also, several preferred embodiments include a variable control, wherein the brightness of the night light can be continuously varied between very dim and full brightness.

48 Claims, 7 Drawing Sheets

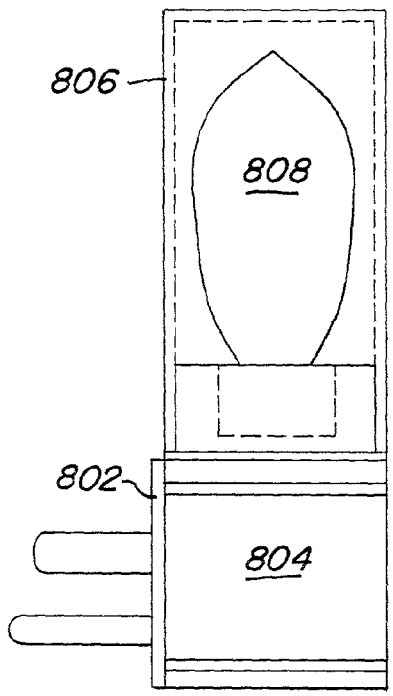
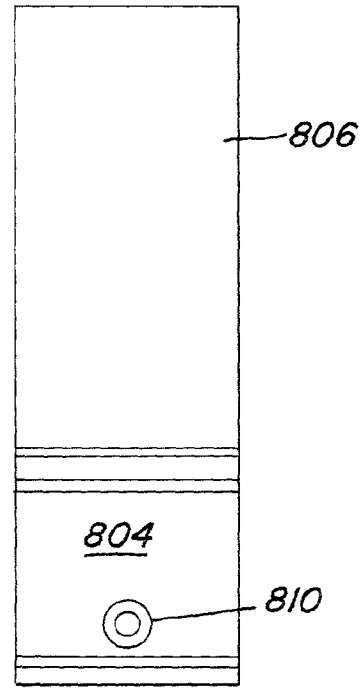
Fig. 8A          Fig. 8B
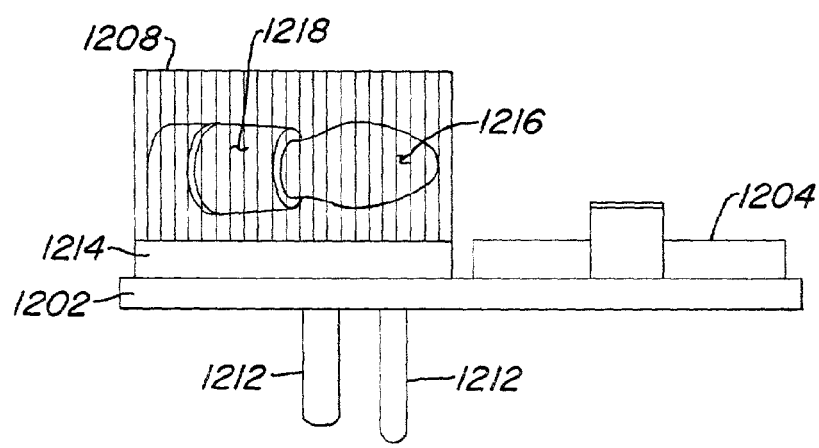
Fig. 12C

US 7,874,717 B1

NIGHT LIGHT

CROSS REFERENCE TO RELATED APPLICATIONS

This is a continuation, of application Ser. No. 09/222,901, filed 30 Dec. 1998, entitled "Night Light now U.S. Pat. No. 6,390,647."

This application claims priority from U.S. Provisional application No. 60/070,248, filed Dec. 31, 1997, which is hereby incorporated by reference hereinto in its entirety.

BACKGROUND OF THE INVENTION

1. Field of the Invention

The present invention relates generally to lighting devices, and more particularly to night lights having adjustable controls.

2. Description of the Prior Art

It is common to provide one or more night lights in various rooms of the home. The lights are plugged in to any convenient outlet, and provide a relatively small amount of light suitable for finding one's way when other light sources are off. This is very useful for providing enough light to move around the house, without being so bright as to interfere with sleeping.

Until now, night lights generally available have a fixed brightness, and must be switched on and off by hand. Some designs have proposed various more complicated controls, but have not met the requirements and desires of those needing more flexibility in a night light.

Also, night lights have previously been limited to indoor use. In certain instances, it would be desirable to provide a night light which could be used outdoors to provide limited lighting without the necessity for installing a complex permanent fixture. An outdoor night light could be used temporarily for any of a wide variety of purposes, or could be left in place to illuminate, for example, a door to aid in night entry into the home.

Whether for indoor or outdoor use, it would be desirable to provide a night light fixture which is inexpensive, while providing lighting levels and control functions beyond those available on current products.

SUMMARY OF THE INVENTION

In accordance with the present invention, a night light design is provided which allows for improved functionality over those heretofore available. The basic design is flexible enough to be adapted for either indoor or outdoor use, and for various brightness levels. Particularly for outdoor use, bulbs of up to 15 watts can be used, providing an increased illumination level. All designs preferably include a light sensing element and a control circuit, wherein the light turns itself on when the ambient lighting levels fall low enough. Also, several preferred embodiments include a variable control, wherein the brightness of the night light can be continuously varied between very dim and full brightness.

BRIEF DESCRIPTION OF THE DRAWINGS

The invention, as well as preferred modes of use, further objectives and advantages thereof, will best be understood by reference to the following detailed descriptions of illustrative embodiments when read in conjunction with the accompanying drawings, wherein:

FIG. 8A is a side view illustrating an alternative embodiment of the night light shown in FIG. 6A;

FIG. 8B is a front view of the embodiment shown in FIG. 8A;

FIG. 12C is a side view of the embodiment shown in FIG. 12A; and

DESCRIPTION OF THE PREFERRED EMBODIMENTS

Several features of the invention are described below in various embodiments and combinations. It will be appreciated by those skilled in the art that various additional combinations of features may be implemented while utilizing the teachings of the present invention.

Figure 1:
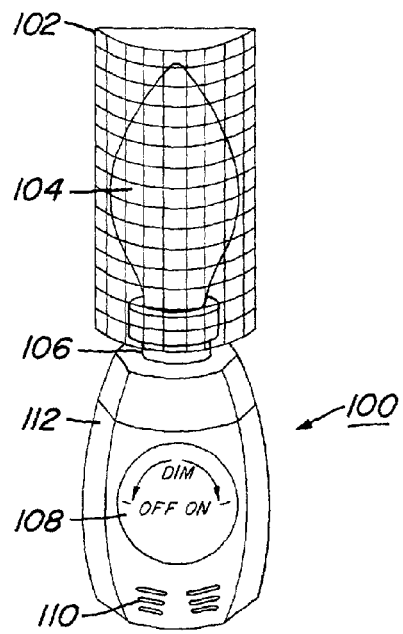
FIG. 1 illustrates a night light according to the present invention.

FIG. 1 illustrates night light 100 according to the present invention. Forming the central portion of night light 100 is base 112. Base 112 provides the central support structure for night light 100, and contains the majority of the electrical components of night light 100. Located on the back portion of base 112 is either a two or three prong plug which is designed to be received in any common electrical outlet.

On the front portion of base 112 is dimming knob 108. Dimming knob 108 is connected to a dimming switch internal to base 112. This dimming switch controls the brightness of light bulb 104, and can switch light bulb 104 on or off. In one embodiment of the present invention, the dimming switch is a rheostat type device, but, the dimming switch could also be a solid-state, semiconductor device. The dimming switch can be in one of three states: the off state, the dimming state, and the on state. The dimming switch can be put into the off state by turning dimming knob 108 fully clockwise. When a user turns dimming knob 108 from the dimming state to the off state, and vice versa, they will feel dimming knob 108 "click." While the dimming switch is in the off state, light bulb 104 will never switch on.

In a similar manner, the dimming switch can be switched to the on state by turning dimming knob 108 fully counterclockwise. The user will feel dimming knob 108 click when it is turned from the dimming state to the on state, and vice versa. When the dimming switch is in the on state, light bulb 104 will shine continuously.

The dimming switch is put into the dimming state by turning dimming knob 108 slightly counterclockwise from the off state, or slightly clockwise from the on state. When light bulb 104 is switched on by sensors 110 (as will be described below) and the dimming switch is in the dimming state, the dimming switch will control the brightness of light bulb 104. To make light bulb 104 appear dim, dimming knob 108 is turned to the far clockwise position of the dimming state. To make light bulb 104 appear bright, dimming knob 108 is turned to the far counterclockwise position of the dimming state.

When the dimming switch is in the dimming state, light bulb 104 will be switched on by sensors 110. Sensors 110 are comprised of either an ambient light sensor, a motion sensor, or both. If night light 100 contains an ambient light sensor, light bulb 104 will be switched on when the ambient light around night light 100 decreases to a predetermined level. Generally, this level will be at the point where persons begin to find it difficult to make out objects around them. If night light 100 contains a motion sensor, light bulb 104 will be switched on when the motion sensor detects movement in the vicinity of night light 100. If night light 100 includes both a motion and an ambient light sensor, light bulb 104 will be switched on during low light levels by the ambient light sensor and will be switched on by the motion sensor at other times when motion is detected around night light 100. If light bulb 104 is tarried on by the motion sensor, the light will stay on for a predetermined period of time and then will switch off. Either the motion sensor or the ambient light sensor, or both, can have a variable control (not shown) to set the sensitivity to a desired level. In the preferred embodiment, sensors 110 control light bulb 104 only when the dimming switch is in the dimming state. If the dimming switch is in the off state, sensors 110 will have no effect on light bulb 104. Likewise, if the dimming switch is in the on state, sensors 110 will again have no effect on light bulb 104.

Covering light bulb 104 is textured cover plate 102. Textured cover plate 102 can be constructed of many materials, including both plastic and glass. Textured cover plate 102 both protects light bulb 104 from being broken and prevents objects from inadvertently coming in contact with the hot bulb. Textured cover plate 102 can also diffuse the light of light bulb 104, resulting in a "softer" light emanating from night light 100. In one embodiment of the present invention, light bulb 104 is a 15 Watt bulb.

Night light 100 can be designed to be used both indoors and outdoors. In order to be suitable for use outdoors, water and dirt must be prevented from entering base 112, where they could damage or otherwise render inoperable the electronics. Seal 106 is used to prevent water from entering where the light socket and base 112 join. Likewise, there are other seals behind dimming knob 108. The slits in base 112, which allow sensors 110 to monitor the outside world, have been designed to keep the intrusion of water and dirt into base 112 to a minimum. These weatherproofing design features allow night light 100 to be used outdoors, where many other night lights cannot.

Figure 2:
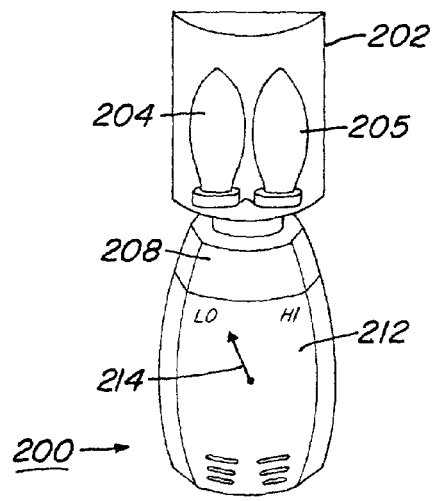
FIG. 2 illustrates a second embodiment of a night light according to the present invention.

FIG. 2 illustrates a second embodiment of a night light according to the present invention. Night light 200 is similar to night light 100, with some differences which will be described below. Night light 200 contains 2, 7 to 7½ Watt light bulbs, light bulb 204 and light bulb 205. Whether a single light bulb or both light bulbs are illuminated when the dimming switch is in any particular state depends upon the setting of high-low switch 214. When high-low switch 214 is in the low position, only light bulb 204 can be illuminated. As with night light 100, the illumination of light bulb 204 will depend upon the state of the dimming switch. When high-low switch 214 is in the high position, both light bulb 204 and light bulb 205 can be illuminated, depending upon the setting of the dimming switch.

Whereas the dimming switch in night light 100 was controlled by dimming knob 108 on the front portion of base 112, the dimming switch of night light 200 is contained within base 212. The dimming switch used with night light 200 is rotated by turning cover plate 202. This type of operation eliminates the opening in base 212 created by connecting the dimming knob to the dimming switch. This feature makes night light 200 more resistant to the effects of water and dirt.

Figure 3:
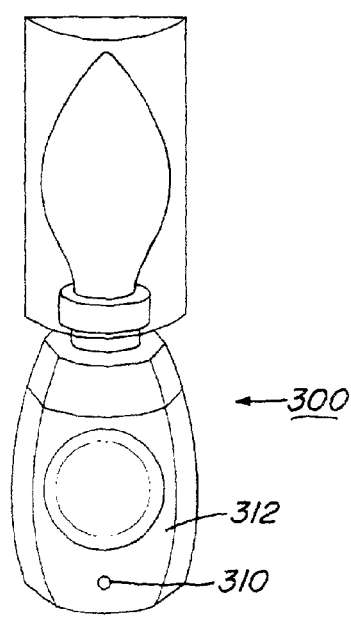
FIG. 3 depicts a third embodiment of a night light according to the present invention.

FIG. 3 illustrates a third embodiment of a night light according to the present invention. Night light 300 is similar to night light 100, shown in FIG. 1, with the exception that sensor 310 is mounted flush with base 312. As noted above, night light 100 contains slits in its base to allow sensors 110 to view the external surroundings. In night light 300, sensor 310 is mounted flush with and is sealed against base 312. This provides additional protection from the intrusion of water and dirt into the inner portions of base 312. As shown in FIG. 3, sensor 310 is either an ambient light sensor or a motion sensor.

Figure 4:
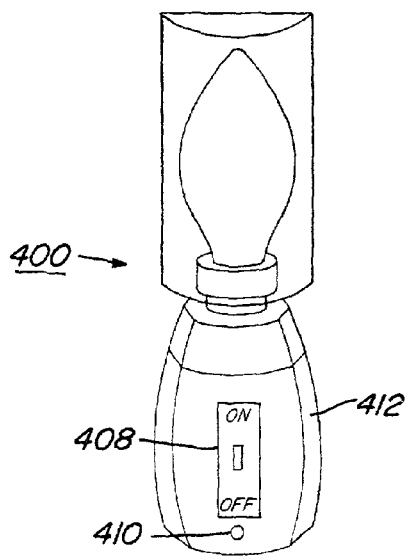
FIG. 4 depicts a fourth embodiment of a night light according to the present invention.

FIG. 4 illustrates a fourth embodiment of a night light according to the present invention. Night light 400 is similar to the one shown and described in FIG. 1, with the exception of sliding dimmer switch 408 and sensor 410. Sensor 410 is similar to the sensor contained within night light 300, shown in FIG. 3. Sliding dimmer switch 408 is used in place of dimmer knob 108 and the associated dimming switch. Like the dimming switch used in night light 100, sliding dimmer switch 408 can be in one of three states. However, instead of rotating about a central axis, sliding dimmer switch 408 moves vertically with respect to base 412. When sliding dimmer switch 408 is depressed fully downward, night light 400 will be put into the off state and will be turned off. In a similar manner, when sliding dimmer switch 408 is positioned to the top of its range of travel, night light 400 will be in the on state. When sliding dimmer switch 408 is somewhere between the on state and off state, it will be in the dimming state and will function like the dimming switch in night light 100.

Figure 5A:
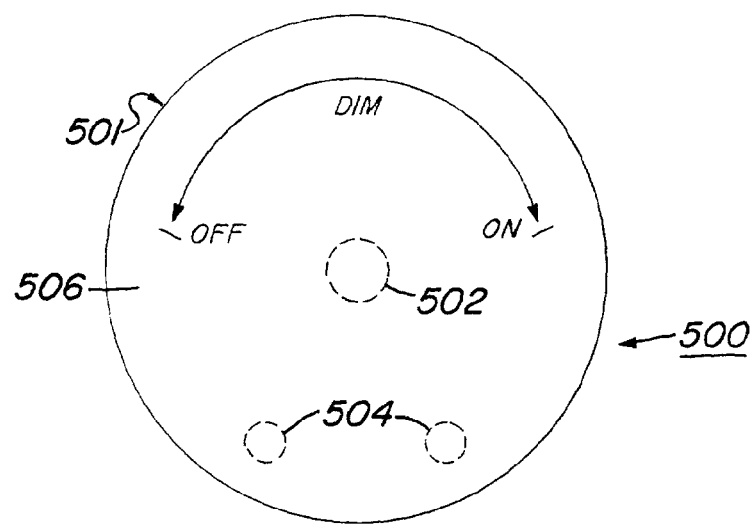
FIG. 5A shows another embodiment of a night light according to the present invention.

FIG. 5A shows another embodiment of a night light according to the present invention. Instead of having a cover plate located above a base portion, cover plate 506 of night light 500 is located in front of and completely surrounds base 501. Thus, when night light 500 is plugged into a socket, all that is visible is cover plate 506.

Figure 5B:
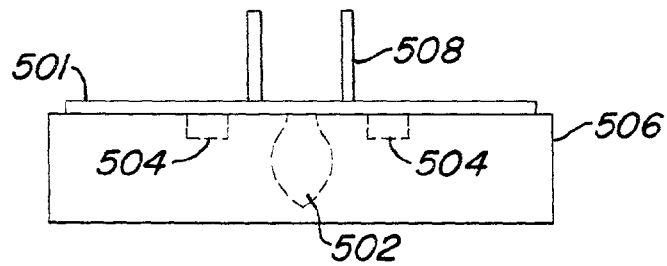
FIG. 5B illustrates a side view of the night light shown in FIG. 5A.
Figure 5C:
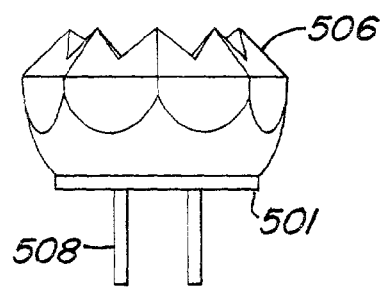
FIG. 5C illustrates a preferred cover plate design for the night light shown in FIG. 5A.

Although the arrangement of base 501 and cover plate 506 is different than the corresponding arrangement of night light 100, night light 500 functions in a manner similar to that of night light 100. The activation of light bulb 502 is controlled by rotating cover plate 506 as described in the discussion of night light 200. Also controlling the activation of light bulb 502 are sensors 504. FIG. 5B illustrates a side view of night light 500. FIG. 5B shows the location of electrical plug 508. Because the cover plate 506 is rotatably attached to the base 501, no separate control is needed. This is similar to the dimming function of the embodiment described in FIG. 2. The design of FIG. 5 provides minimal size combined with enhanced aesthetics, while still allowing a dimmer function to be incorporated. FIG. 5C illustrates a preferred cover plate design which is pleasing to view as well as functional.

The specific examples set forth above have illustrated several combinations of features, and it will be appreciated by those skilled in the art that other combinations of these and similar features can be used. For example, given the teachings contained in the above descriptions, it will be apparent that any design can incorporate a cover plate which is rotatable with respect to the base. This would allow any night light design to provide the dimmer function without the addition of an extra dimmer control. In a similar manner, ambient light and motion sensors may be included or deleted from any particular design as desired. The embodiment shown in FIG. 1 describes one possible control function relating to setting the dimmer control to the ambient light or motion sensors, but it will be apparent to those skilled in the art that different control functions are possible. For example, a fully "on" position, which bypasses the sensor control functions could be eliminated. As another example, the motion sensor could be set to always turn the night light on to its full brightness, while the ambient light sensor would energize the night light at the lighting level set by the dimmer switch. Many other combinations of features can be utilized.

One preferred feature of the invention is that at least some models of the night light be suitable for outdoor use. Because this requires sealing the unit against dirt and weather, designs intended for outdoor use may be simpler than those intended for indoor use. For example, an outdoor light of the style shown in FIG. 5B could be provided with a simple on-off switch rather than a dimmer, and possibly combined with an ambient light sensor. With the device turned on, the night light would always on. When the switch is set in the off position, the ambient light sensor would turn the light on when the ambient light levels dropped below a preselected level. A third, completely off, switch position could be provided if desired. Other variations will become apparent to those skilled in the art. Several embodiments intended for outdoor use are described below in more detail.

Another useful feature of the embodiments described above is that at least some models provide for greater light output than is typically provided in night lights heretofore available. Incorporation of a bulb in the 15-20 watt range would provide a fairly high illumination level which is particularly useful outdoors. Because 7 watt bulbs are already generally available, some designs may include two or more bulbs in a single housing to obtain the desired illumination.

Some additional night light units will now be described. In large part, these units include various of the features set forth above. In some cases, additional features will be described, and those skilled in the art will understand the following descriptions insofar as they relate to the previous descriptions and features.

Figure 6A:
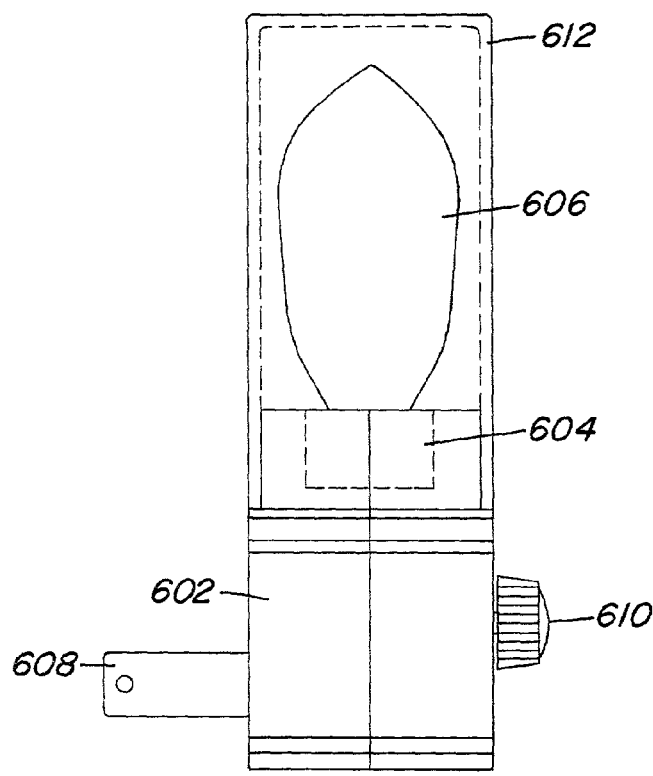
FIG. 6A depicts yet another embodiment of a night light according to the present invention.
Figure 6B:
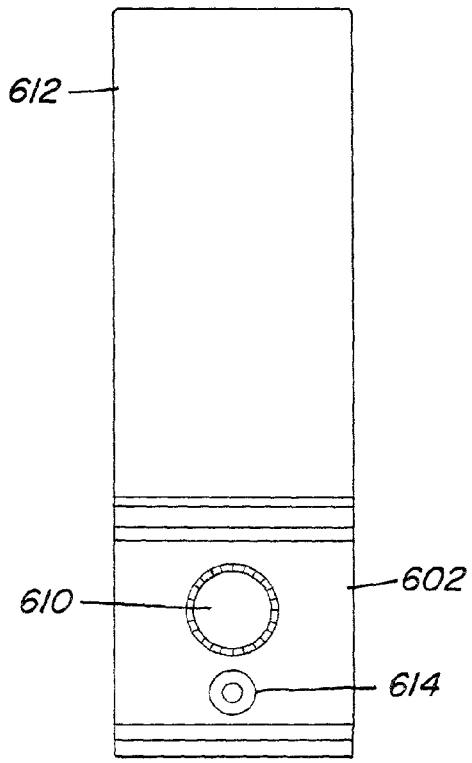
FIG. 6B is a front view of the night light shown in FIG. 6A.

FIG. 6A is a side view of yet another night light according to the present invention. FIG. 6B is a front view of the same night light unit. The unit includes a housing 602 having a socket 604 for a bulb 606. Blades 608 project from the rear of the unit to connect it to a wall receptacle. A dimmer control 610 projects from the front of the housing 602. As seen in FIG. 6B, a photocell 614 is mounted immediately below the dimmer control 610, and is used to turn the light on in low ambient light conditions as previously described. Cover plate 612 covers the bulb 606, and is clear, frosted, or textured as desired to provide the appropriate light levels when the bulb 606 is on.

In order to prevent overheating of the unit, vents (not shown) are preferably provided in the top of the cover plate 612. Vents may also be provided in the sides of the cover plate 612 near the bottom to provide improved airflow over the bulb 606. This allows heated air to rise from the bulb 606, keeping it significantly cooler than would be the case with no venting. Keeping the bulb 606 and cover plate 612 cooler contributes both to safety and to enhanced bulb life.

Figure 7:
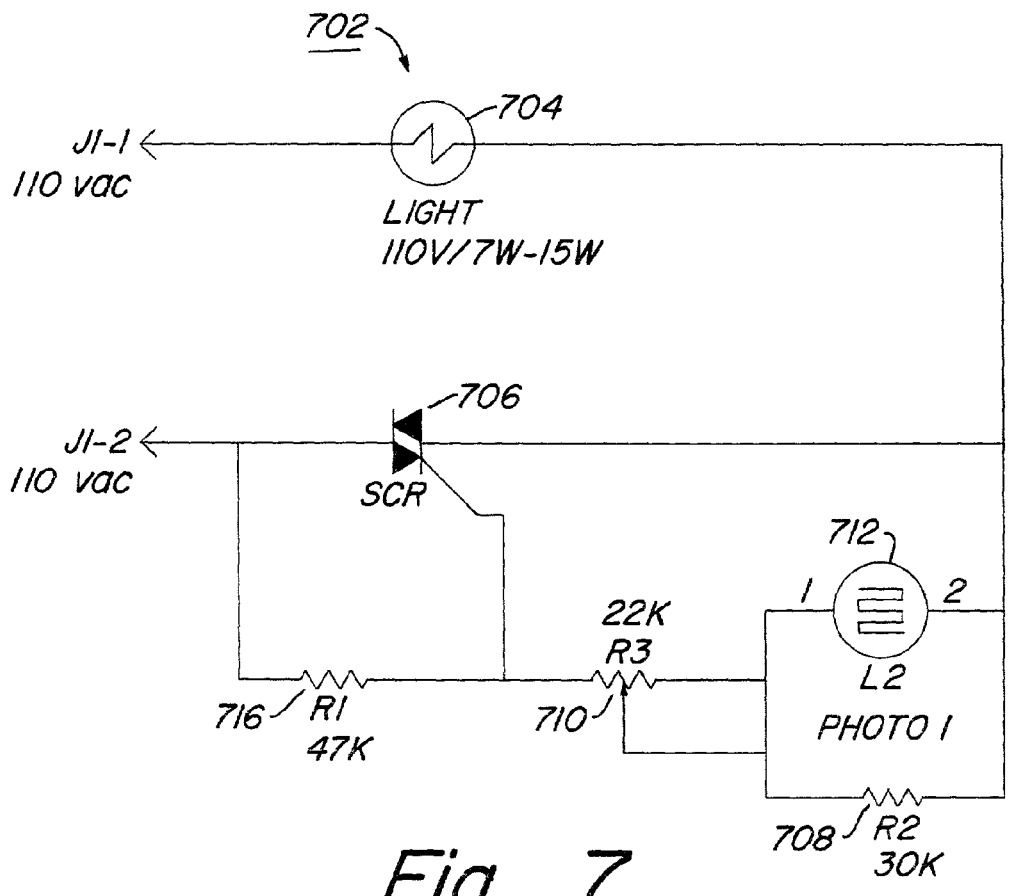
FIG. 7 is a schematic diagram of a preferred control circuit for use with various night light designs.

FIG. 7 depicts a preferred control circuit for use with the embodiment of FIG. 6. This same control circuit is suitable for use with the previously described embodiments, and with most of the following embodiments as will be described below. Control circuit 702 for a night light bulb 704 includes a triac 706 (or other solid state switch) as the primary control, in a manner well known to those skilled in the art. Resistors 708, 710 control current into the gate of the triac 706, with resistor 710 being variable to control the brightness setting of the night light.

Photocell 712 is used to vary the current into the control gate of triac 706, thereby controlling the brightness of bulb 704. The resistance of photocell 712 varies with the ambient light, decreasing with decreasing ambient light levels, and thus increasing the control gate current. Increasing the control gate current increases current flow through bulb 704 as is known in the art. Bypass resistor 716 functions to limit current flow through the photocell 712. For use with a 110 volt supply and a bulb 704 of 7-15 watts, the following component values can be used: resistor 716 has a resistance of 47K ohms, resistor 710 can be varied from 0-22K ohms, and resistor 708 has a value of 30K ohms. The photocell can be any of a large number of generic photocells, such as the EG&G Optoelectronics Night Light Control (models VT800 or VT900). The triac can be any suitable device, such as the Piher 300K device, reference # 217. As will be appreciated by those skilled in the art, variations on the described control circuit, suitable for use with particular devices, will be suitable for use with the night light.

FIGS. 8A and 8B illustrate a variation on the embodiment of FIG. 6. This embodiment is suitable for use outdoors. It includes a gasket 802 on the rear of the housing 804 to seal the housing 804 to be weathertight. Cover plate 806 is also sealed to be weathertight. Alternatively, cover plate 806 can include vents as in the embodiment of FIG. 6, and a gasket (not shown) around the base of the bulb 808 to seal the electronics from the weather.

As can be seen in FIG. 8B, the outdoor light preferably has only a photocell sensor 810 to turn the light on when ambient light drops. Normally, outdoors an on/off switch is not important, as the light is always wanted on when it is dark. The photocell 810 can be located behind a clear portion of the housing 804. Deleting the knob for the controller eliminates the difficulty of sealing around the shaft of the variable resistor, and lowers cost for the unit at the same time. The control circuit of FIG. 7 can be used for this night light, with the variable resistor 710 shorted out.

Figure 9:
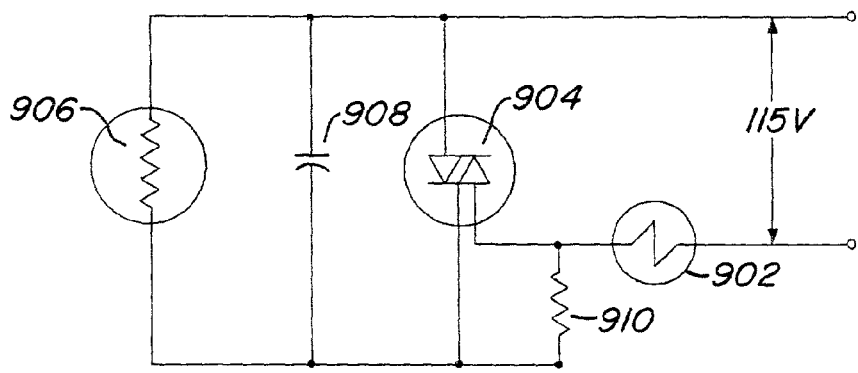
FIG. 9 is an alternative control circuit for use with various night light designs.

An alternative circuit for use primarily with outdoor night lights is illustrated in FIG. 9. This circuit is turned on and off as a function of ambient light levels, and does not include a dimmer function. In the circuit of FIG. 9, bulb 902 is turned on and off by triac 904. Photocell 906 is connected to the control gate of the triac 904, and turns the triac on when ambient light levels drop low enough. Capacitor 908 assists operation of photocell 906 as known in the art, and resistor 910 performs a current-limiting function in case the 902 burns out.

The control circuit in FIG. 9 is suitable for use with the outdoor night light of FIGS. 8A and 8B, but is less desirable for use with indoor lights because the dimming feature is not provided.

Outdoor night lights are also preferably provided with a ground-fault circuit interrupter (GFCI), which is connected to either the control circuit of FIG. 7 or the control circuit of FIG. 9 as known in the art. In order for a GFCI to work, of course, the night light must be provided with a three-terminal grounded plug such as shown in FIG. 8A. One GFCI device which is suitable for use in night lights of the present type is the LM1851N manufactured by National Semiconductor. Other GFCI units are available, and may be included in either control circuit as is known in the art.

Figure 10A:
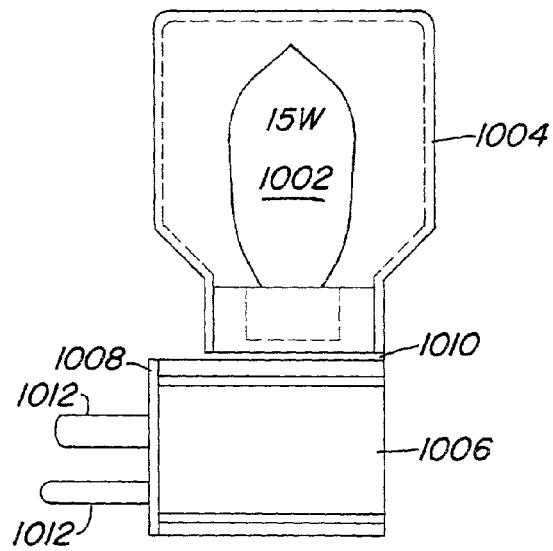
FIG. 10A depicts an outdoor embodiment of a night light according to the present invention.
Figure 10B:
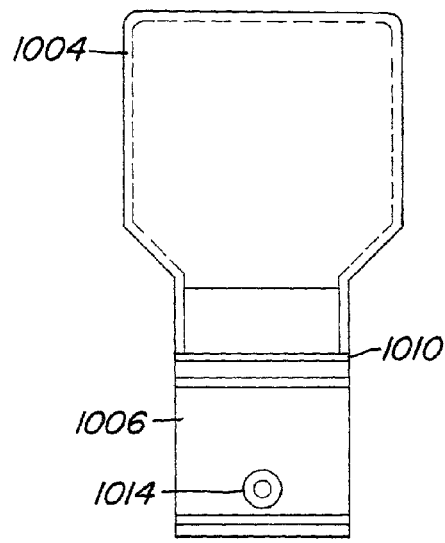
FIG. 10B is a front view of the night light shown in FIG. 10A.

FIGS. 10A and 10B depict another embodiment of the night light of the present invention which is intended for outdoor use. It is similar to the embodiment of FIGS. 8A and 8B, except that it is designed for use with a 15 watt bulb, rather than the standard 7 watt bulb as is the case with FIGS. 8A and 8B.

Because the 15 watt bulb 1002 is larger and hotter, the cover plate 1004 is larger. As before, cover plate 1004 may include vents, with a gasket (not shown) around the base of the bulb 1002. Or, it may be unvented, with the cover plate 1004 completely weather sealed, such as by a gasket or O-ring 1010 around its base. Housing 1006 is extended rearwardly because of the larger cover plate 1004. A gasket 1008 is used to seal the rear portion of the housing 1006 adjacent to the blades 1012, which are of the three prong grounded type as described with respect to FIG. 8A. As before, the ground fault interrupter circuit is preferably added to the control circuit, as described with reference to FIGS. 7 and 9.

As before, this design preferably has no dimmer switch, but uses a photocell 1014 to turn the unit on when ambient light levels drop. A separate on/off switch may be provided, but is not shown in FIG. 10B. Because the unit can simply be unplugged to turn it off, such a switch is generally not necessary or desired.

Figure 11A:
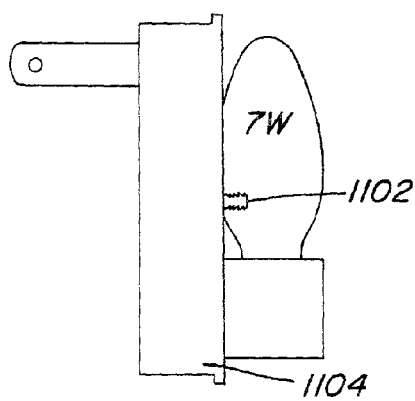
FIG. 11A illustrates construction details of the embodiment shown in FIG. 5A.
Figure 11B:
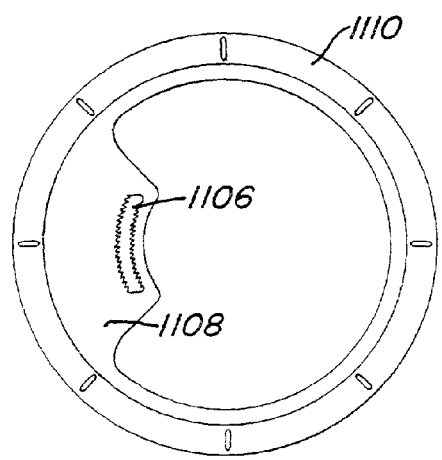
FIG. 11B shows additional details of the embodiment shown in FIG. 5A.

FIGS. 11A and 11B illustrate additional details of the night light unit previously described with respect to FIGS. 5A, 5B and 5C. FIG. 11A shows the base portion of the night light with the cover plate 506 removed.

Referring to FIG. 11A, a side view of the night light shows a dimmer knob 1102 projecting from the housing 1104. This knob has teeth, or grooves, to engage corresponding teeth or grooves with the arcuate slot 1106 shown in FIG. 11B. 11B is a view from the rear of the cover plate, showing the supporting ring structure and a projecting region 1108 which contains the arcuate slot 1106. As the cover plate is rotated, the ring 1110, and thus the projecting region 1108, rotate with it. The engagement of teeth between the arcuate slot 1106 and the dimmer knob 1102 causes the dimmer knob 1102 to rotate, varying the resistance of the control circuit as shown in FIG. 7 and brightening and dimming the output of the night light. Other mechanical constructions for adjusting the value of a resistor by turning the cover plate 506 will become apparent to those skilled in the art.

A variation of an outdoor night light which can be more permanently mounted is shown in FIGS. 12A, 12B, 12C, and 12D. An alternative design for an outdoor night light which is simple and useful, but not so easily removable as the plug-in version previously described, is shown. In general, a night light of this embodiment is incorporated into a cover plate for a standard two-outlet electrical receptacle which is substituted in place of the normal cover plate used for outdoor receptacles.

Figure 12A:
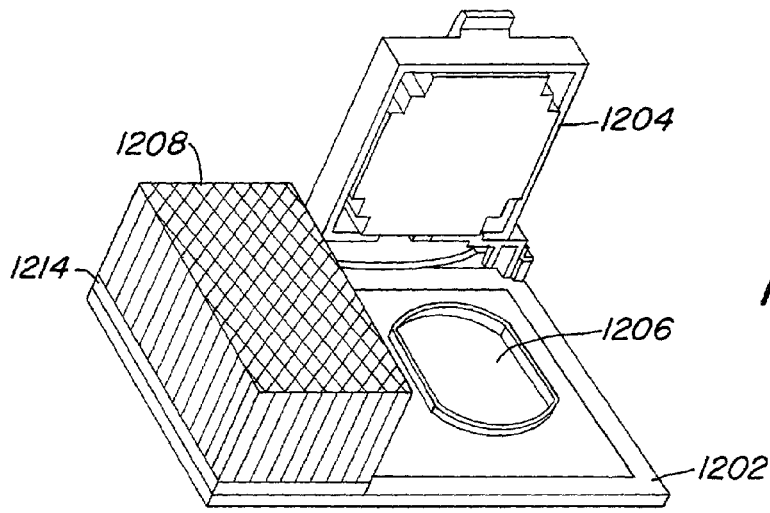
FIG. 12A is a perspective view of a final illustrative preferred embodiment of the invention.

FIG. 12A is a perspective view showing the night light unit/outlet box covering of the present invention. When the standard, existing outlet box cover is removed, normally by the removal of single, central screw, the cover of FIG. 12A is inserted in its place. The cover includes a cover portion 1202 similar to a standard outlet box cover. The unit includes a hinged door 1204 which is connected to the cover portion in the usual manner and covers an opening 1206 in precisely the same manner as standard outdoor outlet box covers. In other words, the right-hand portion of the unit as shown in FIG. 12A is a standard replacement for the outlet box cover already normally installed.

The left-hand portion of the unit, as shown in FIG. 12A, is covered by a cover plate 1208, which is made out of any suitable transparent material and functions as does the cover plate on any of the previously-described night lights. The cover plate 1208 is large enough to completely cover up one side of the cover portion 1202.

Figure 12B:
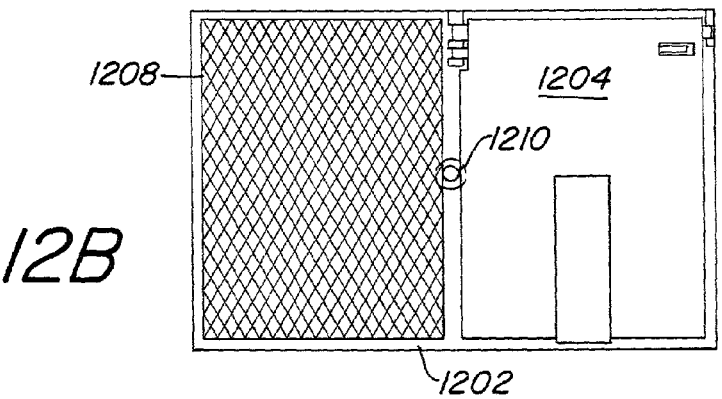
FIG. 12B is a top view of the embodiment shown in FIG. 12A.

This can be seen more clearly in FIG. 12B, which is a top view of the unit, as installed, with the hinged door 1204 in the closed position. Screw hole 1210 is provided for attaching the cover portion 1202 to the underlying receptacle in the outlet box.

Referring to FIG. 12C, the lighting unit is seen to have a standard three-prong blade set 1212 extending from beneath the cover plate 1208. Blades 1212 are aligned to plug into one side of the underlying outlet, leaving the other side free to be exposed through the opening 1206. Beneath the cover plate 1208, and disposed on the cover portion 1202, is a housing 1214 which contains the control circuitry for the night light. Bulb 1216 is screwed into socket 1218, both of which are contained within the cover plate 1208 in much the manner of any other outdoor night light as previously described.

Figure 12D:
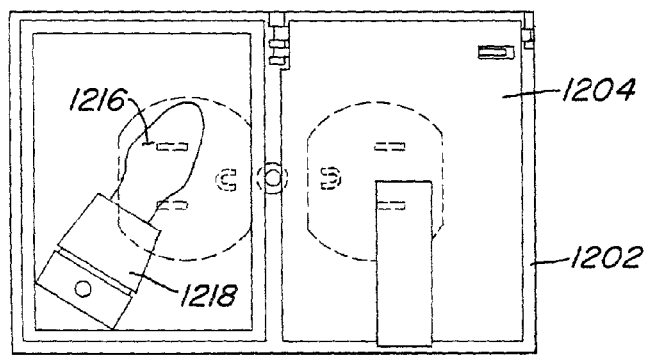
FIG. 12D is a top and partially broken away view of the embodiment shown in FIG. 12A.

FIG. 12D is another top view of the unit, with the cover plate 1208 removed, and the hinged door 1204 in the closed position. Shown in phantom are the underlying receptacles within the outlet box. As can be seen from viewing FIGS. 12C and 12D together, the blades 1212 plug directly into the underlying receptacle. This allows the unit to be designed as simply a replacement outlet box cover, with no rewiring of any type needed.

The replacement outlet box cover is provided with necessary gaskets to seal both the cover plate 1208, and the cover portion 1202 against the underlying surface so that the outlet box is also sealed. These sealing techniques are similar to those in wide use on outlet box cover plates. This design allows the night light to be replaced by any homeowner in less than two minutes with a single screwdriver, and requires no rewiring whatsoever. The resulting outlet, instead of having two receptacles, now has a single, weatherproof receptacle and an attached night light. This night light is preferably the type which uses a photocell control, without the dimmer function, as described in connection with FIG. 9.

As will be appreciated by those skilled in the art, the above described preferred embodiments illustrate several features of the present invention. A night light with a variable dimmer is flexible in use, allowing a relatively bright bulb to be controlled to a dimmer light output. If full light output is needed it is available; if less light is needed, that is easily obtained by controlling the dimmer. This easy control means that the user does not have to provide separate lights or replacement bulbs, which is inconvenient.

Also, several designs suitable for use as outdoor night lights have been illustrated. Standard night lights are not used outdoors because of their lack of protection against the elements. Proper sealing as described allows the benefits of a night light to be obtained out of doors. Because some of the designs are removable, the night lights may be placed and used as desired. If a relatively permanent light is desired, the alternative of FIG. 12 can be installed by any homeowner in just a minute or 2 using no special tools. This type of installation provides a light source at an existing outlet, which is often located near a door. These locations are the ones most likely to be needed, to assist in finding of keys, etc., to enter the house at night. Additional benefits, such as being able to identify visitors at night, discouraging prowlers, and being able to view unfavorable weather conditions such as icy sidewalks, are also obtained. The relatively permanent installation prevents pilferage, while leaving one receptacle available for other use.

While the invention has been particularly shown and described with references to several preferred embodiments, it will be understood by those skilled in the art that various changes in form and detail may be made therein without departing from the spirit and scope of the invention.

What is claimed is:

1. An improved night light comprising:
    a housing suitable for connecting to an electrical outlet, said housing having a front and a back, and at least two conductive blades extending from the back of said housing in an arrangement suitable for insertion into an electrical outlet, whereby insertion of said conductive blades into said electrical outlet places said housing back into a position immediately adjacent to said electrical outlet;
    a light source mounted on said housing;
    a switch mounted to said housing, said switch being capable of manipulation by a person, said switch settable to at least three positions; and
    a control circuit within said housing, said control circuit being connected to said switch and to said light source;
    wherein said control circuit is operable to turn said light source off when said switch is set to a first position, to turn said light source on at a first brightness when said switch is set to a second position, and to turn said light source on at a second brightness brighter than said first brightness when said switch is set to a third position.

2. The improved night light of claim 1, wherein said control circuit controls the brightness of said light source to have a brightness that varies continuously as a function of the position of said switch when a switch extending portion is moved between the second and third positions.

3. The improved right light of claim 2, wherein said control circuit is a solid state controller.

4. The improved night light of claim 1, wherein said first brightness and second brightness are discrete brightness levels, and wherein said control circuit is not operable to turn said light source on at a brightness intermediate said first brightness and said second brightness.

5. The improved night light of claim 1, further including a photosensitive device connected to said control circuit wherein said control circuit is operable in response to ambient light levels detected by said photosensitive device, wherein said light source is turned off in response to an ambient light level greater than a threshold level, and wherein said light source is operated as defined by the position of said switch when the ambient light level is less than the threshold level.

6. The improved night light of claim 1, wherein said switch is a rotary switch.

7. The improved night light of claim 1, wherein said control circuit is manipulated by a user turning a portion of said housing itself with respect to the remainder of said housing.

8. An improved night light, comprising:
    a housing suitable for connecting to an electrical outlet, wherein said housing includes a socket;
    a bulb mounted on the said housing, wherein said bulb is mounted on said housing by inserting said bulb into said socket;
    a gasket around the base of said bulb to seal said socket from the weather;
    a cover plate over said socket and said bulb, said cover plate having vents formed therein;
    a switch having a portion extending from said housing, said extending portion being capable of physical movement by a person between at least a first, a second, and a third position; and
    a control circuit within said housing, said control circuit being connected to said switch for connecting said bulb to electrical power from said electrical outlet, wherein said control circuit is operable to turn said bulb off when said switch is in said first position to turn said bulb on at a first brightness when said switch is in said second position and to turn said bulb on at a second brightness brighter than said first brightness when said switch is in said third position.

9. An improved night light, comprising:
    a housing suitable for connecting to an electrical outlet, said housing having a front and a back, and at least two conductive blades extending from the back of said housing in an arrangement suitable for insertion into the electrical outlet, whereby insertion of said at least two conductive blades into the electrical outlet places said housing back into a position immediately adjacent the electrical outlet;
    a first and a second light source mounted on said housing;
    a switch having a portion extending from said housing, said extending portion capable of physical movement by a person between at least a first, a second, and a third position; and
    a control circuit within said housing, said control circuit being connected to said switch for selectively connecting said first and second light sources to the electrical outlet;
    wherein said control circuit is operable to turn both light sources off when said switch is in said first position, to turn the first light source on when said switch is in said second position, and to turn both light sources on when said switch is in said third position.

10. The improved night light of claim 9, wherein said switch is a rotary switch.

11. The improved night light of claim 9, wherein said switch extending portion is manipulated by a user turning a portion of said housing itself with respect to the remainder of said housing.

12. The improved night light of claim 9, wherein said first and second light sources are bulbs.

13. The improved night light of claim 12, wherein said first and second light sources are incandescent bulbs.

14. An improved night light for use in an outdoor installation, comprising:
    an outlet box cover adapted to mount over an electrical outlet in an outlet box, said electrical outlet having at least a first and a second electrical outlet;
    a light transmitting cover plate over a portion of said outlet box cover, said light transmitting cover plate being positioned so as to cover said first electrical outlet when said outlet box cover is installed over said outlet box;
    three conductive blades extending from said outlet box cover behind said light transmitting cover plate for insertion into said first electrical outlet, said three conductive blades including two blades for conducting power and a third blade adapted for insertion into a grounding receptacle;

a hinged door connected to said outlet box cover, said hinged door positioned to cover a said second electrical outlet and protect said second electrical outlet from the weather;

a light source mounted under said light transmitting cover plate;

a control circuit within said outlet box cover, said control circuit being connected to said three conductive blades and said light source, to control operation of said light source said light source; and means for sealing said outlet box cover against the weather, whereby the improved night light can be used outdoors.

15. The improved night light of claim 14, wherein said control circuit includes a photosensitive device to turn said light source on and off as a function of ambient light levels.

16. The improved night light of claim 14, wherein said control circuit includes an on/off switch.

17. The improved night light of claim 14, wherein said light transmitting cover plate is transparent.

18. The improved night light of claim 14, wherein said means for sealing said outlet box is a gasket around a backside periphery of said outlet box cover.

19. The improved night light of claim 14, wherein said light transmitting cover plate includes an air vent.

20. The improved night light of claim 14, wherein said light source is an incandescent bulb.

21. The improved night light of claim 20, wherein said light source includes at least two incandescent bulbs.

22. The improved night light of claim 14, wherein said control circuit includes a motion detector to turn the improved night light on in response to movement nearby.

23. The improved night light of claim 14, further including:
a ground fault interrupter connected to said control circuit, wherein the improved night light is protected from the occurrence of an unsafe ground fault condition.

24. The improved night light of claim 14, further including:
a sealing member attached to said outlet box cover and to said light source to provide a weatherproof seal for said light source.

25. The improved night light of claim 24, wherein said light source is a bulb connected to a socket.

26. The improved night light of claim 25, wherein said bulb is an incandescent bulb.

27. The improved night light of claim 25, wherein said sealing member is a gasket around a base of said bulb.

28. The improved night light of claim 14, wherein said control circuit is operable to turn said light source off with a switch when said switch is set to a first position, to turn said light source on at a first brightness when said switch is set to a second position, and to turn said light source on at a second brightness brighter than said first brightness when said switch is set to a third position.

29. The improved night light of claim 28, wherein said control circuit is operable to turn said light source on at a third brightness level brighter than said second brightness level when said switch is set to a fourth position.

30. The improved night light of claim 1, wherein said control circuit is operable to turn said light source on at a third brightness level brighter than said second brightness level when said switch is set to a fourth position.

31. The improved night light of claim 30 wherein said light source is an incandescent bulb.

32. The improved night light of claim 1, wherein said light source is an incandescent bulb.

33. The improved night light of claim 1, further including:
a motion sensor connected to said control circuit, wherein said motion sensor operates with said control circuit to turn said light source on when motion is sensed near the improved night light.

34. The improved night light of claim 1, further including:
a photo sensor connected to said control circuit, wherein said photo sensor operates with said control circuit to turn said light source on when ambient light levels fall below a threshold level.

35. The improved night light of claim 1, wherein said switch is a mechanical switch.

36. The improved night light of claim 1, wherein said light source includes at least two separate light emitting sources.

37. The improved night light of claim 36, wherein said light source includes at least two light emitting bulbs.

38. The improved night light of claim 37, wherein said light emitting bulbs are incandescent bulbs.

39. An improved night light comprising:
a housing suitable for connecting to an electrical outlet; said housing having a front and a back, and at least two conductive blades extending from the back in an arrangement suitable for insertion into an electrical outlet, whereby insertion of said conductive blades into an electrical outlet places said housing back into a position immediately adjacent the electrical outlet;

a light source mounted on said housing, said light source being capable of emitting light at a predetermined brightness; and means attached to said housing for adjusting the level of light provided by said light source to at least three different brightness levels.

40. The improved night light of claim 39, wherein said means for adjusting the level of light is an electrical control circuit for controlling an amount of electric current provided to said light source.

41. The improved night light of claim 40, further comprising:
a motion sensor connected to said light source, wherein said motion sensor operates with said control circuit to turn said light source on when motion is sensed near the improved night light.

42. The improved night light of claim 40, further comprising:
a photo sensor connected to said light source, wherein said photo sensor operates with said control circuit to turn said light source on when ambient light levels fall below a threshold level.

43. The improved night light of claim 39, wherein the said means for adjusting the level of light includes a switch mounted on said housing, said switch having a plurality of positions, each switch position corresponding to a different amount of electric current provided to said light source.

44. The improved night light of claim 39, wherein said light source is a bulb.

45. The night light of claim 44, wherein said bulb is an incandescent bulb.

46. The improved night light of claim 39, wherein said means for adjusting the level of light adjusts the brightness of said light source through a continuous range of brightness levels.

47. The improved night light of claim 39, wherein said means for adjusting the level of light controls the brightness of provided light to be any one of a plurality of discrete brightness levels.

48. An improved night light comprising:

a housing suitable for connecting to an electrical outlet, housing having a front and a back, and at least two conductive blades extending from said back of said housing in an arrangement suitable for insertion into an electrical outlet, whereby insertion of said conductive blades into the electrical outlet places the back of said housing into a position immediately adjacent the electrical outlet;

a light source mounted on said housing, said light source being capable of providing light at a predetermined brightness;

a motion sensor attached to said housing for turning said light source on in response to motion detected near the improved night light;

a switch mounted to said housing and capable of manipulation by a person, said switch settable to at least three positions; and a control circuit within said housing, said control circuit being connected to said switch and to said light source, wherein said control circuit is operable to turn said light source off when said switch is set to a first position, to turn said light source on at a first brightness when said switch is set to a second position, and to turn said light source on at a second brightness brighter than said first brightness when said switch is set to a third position.

* * * * *